(12) United States Patent
Wang et al.

(10) Patent No.: US 9,885,902 B2
(45) Date of Patent: Feb. 6, 2018

(54) TOUCH DISPLAY PANEL, PRODUCING METHOD THEREOF, AND DISPLAY APPARATUS

(71) Applicants: BOE Technology Group Co., Ltd., Beijing (CN); Hefei Xinsheng Optoelectronics Technology Co., Ltd., Anhui (CN)

(72) Inventors: Chen Wang, Beijing (CN); Fengzhen Lv, Beijing (CN); Xiao Guo, Beijing (CN); Xinxia Zhang, Beijing (CN); Kui Lv, Beijing (CN); Kang Xiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/113,485

(22) PCT Filed: Oct. 12, 2015

(86) PCT No.: PCT/CN2015/091744
§ 371 (c)(1),
(2) Date: Jul. 22, 2016

(87) PCT Pub. No.: WO2016/188013
PCT Pub. Date: Dec. 1, 2016

(65) Prior Publication Data
US 2017/0146841 A1    May 25, 2017

(30) Foreign Application Priority Data
May 27, 2015  (CN) .......................... 2015 1 0279881

(51) Int. Cl.
*G02F 1/1333*     (2006.01)
*G06F 3/041*      (2006.01)
(Continued)

(52) U.S. Cl.
CPC .... *G02F 1/13338* (2013.01); *G02F 1/133514* (2013.01); *G02F 1/133528* (2013.01);
(Continued)

(58) Field of Classification Search
CPC ............................ G02F 1/13338; G06F 3/041
See application file for complete search history.

(56) References Cited

U.S. PATENT DOCUMENTS 6,236,386 B1    5/2001  Watanabe
9,389,689 B2    7/2016  Watanabe
(Continued)

FOREIGN PATENT DOCUMENTS

CN        2499461 Y      7/2002
CN      101446168 A      6/2009
(Continued)

OTHER PUBLICATIONS

Copy of International Search Report and Written Opinion for International Application No. PCT/CN2015/091744, dated 18, 2016, 11 pages. Feb.
(Continued)

*Primary Examiner* — Sang V Nguyen
(74) *Attorney, Agent, or Firm* — Westman, Champlin & Koehler, P.A.

(57) ABSTRACT

The present application provides a touch display panel, a method for producing the same and a display apparatus. The touch display panel includes a liquid crystal screen and a protection cover plate covered at a light exiting side of the liquid crystal screen. The touch display panel further includes a sound elimination membrane, located at the light
(Continued)

exiting side of the liquid crystal screen, and configured to eliminate sound waves generated when the touch display panel is touched. With the provision of the sound elimination membrane, the touch display panel can eliminate the vibration sound waves generated during the knocking touch process, and avoid the alignment difference of the liquid crystal molecules by the vibration sound waves, thereby avoiding a display mura caused by the vibration sound waves and further significantly suppressing the display mura generated during the knocking touch process.

17 Claims, 6 Drawing Sheets

(51) Int. Cl.
  *G02F 1/1335* (2006.01)
  *G10K 11/16* (2006.01)
(52) U.S. Cl.
  CPC ............ *G06F 3/041* (2013.01); *G06F 3/0412* (2013.01); *G10K 11/16* (2013.01); *G02F 2001/133302* (2013.01); *G02F 2001/133311* (2013.01); *G02F 2202/28* (2013.01)

(56) References Cited

U.S. PATENT DOCUMENTS

| | | | |
|---|---|---|---|
| 9,513,746 B2 | 12/2016 | Esteve et al. | |
| 2005/0052128 A1* | 3/2005 | Nakanishi | H01H 13/83 313/506 |
| 2007/0176907 A1* | 8/2007 | Ishii | G06F 3/0436 345/177 |
| 2008/0128201 A1* | 6/2008 | Yamaguchi | B32B 3/266 181/286 |
| 2010/0182252 A1* | 7/2010 | Jeong | G02F 1/13338 345/173 |
| 2011/0043077 A1* | 2/2011 | Yeh | F03G 7/005 310/338 |
| 2012/0194464 A1 | 8/2012 | Liu et al. | |
| 2012/0212442 A1* | 8/2012 | Uchida | G06F 3/041 345/173 |
| 2012/0300140 A1 | 11/2012 | Ningrat et al. | |
| 2015/0220214 A1* | 8/2015 | Xue | G06F 3/0412 345/177 |
| 2015/0267402 A1* | 9/2015 | Borrelli | E04B 1/84 181/290 |
| 2015/0314794 A1* | 11/2015 | Takahash I ; Yukio | B61D 17/18 105/397 |
| 2016/0012811 A1* | 1/2016 | Yamagiwa | B60N 3/048 181/290 |
| 2016/0170539 A1* | 6/2016 | Watanabe | H04M 19/047 345/173 |
| 2017/0081843 A1* | 3/2017 | Berneth | E04F 13/0867 |

FOREIGN PATENT DOCUMENTS

| | | | | |
|---|---|---|---|---|
| CN | 201311631 | * | 9/2009 | ............ G06F 3/044 |
| CN | 201311631 Y | | 9/2009 | |
| CN | 202711215 U | | 1/2013 | |
| CN | 202730663 U | | 2/2013 | |
| CN | 202882155 U | | 4/2013 | |
| CN | 103576995 A | | 2/2014 | |
| CN | 103902097 A | | 7/2014 | |
| CN | 104166490 A | | 11/2014 | |
| CN | 104849897 A | | 8/2015 | |
| JP | H0798590 A | | 4/1995 | |
| JP | H11184630 A | | 7/1999 | |
| KR | 100189343 B1 | | 6/1999 | |

OTHER PUBLICATIONS

English translation of Box No. V of the Written Opinion of the International Searching Authority for International Application No. PCT/CN2015/091744, 2 pages.
Cppy of First Office Action from Chinese Patent Application No. 201510279881.X, dated Apr. 24, 12 pages.
Copy of Second Office Action from Chinese Patent Application No. 201510279881.X, dated Sep. 28, 2017, 10 pp.

* cited by examiner

TOUCH DISPLAY PANEL, PRODUCING METHOD THEREOF, AND DISPLAY APPARATUS

CROSS-REFERENCE TO RELATED APPLICATION

This Application is a Section 371 National Stage Application of International Application No. PCT/CN2015/091744, filed 12 Oct. 2015, entitled "TOUCH DISPLAY PANEL, PRODUCING METHOD THEREOF, AND DISPLAY APPARATUS", which has not yet published, and which claims priority to Chinese Application No. 201510279881.X, filed on 27 May 2015, incorporated herein by reference in their entirety.

BACKGROUND OF THE INVENTION

Field of the Invention

The present application relates to the technical field of display, and particularly, to a touch display panel, a method for producing the same and a display apparatus.

Description of the Related Art

Currently, a liquid crystal panel having a touch function has been used widely. A basis structure of the liquid crystal panel has a protection cover glass 2 as an outermost layer and a liquid crystal panel 4 as a lowest layer, and both of them are completely attached by a transparent optical adhesive 5 (OCA), as shown in FIG. 1.

When a touch operation of the liquid crystal panel is performed, it tends to lead to touch mura. Such touch mura is generally caused by two kinds of reasons. The first reason is that the liquid crystal panel 4 generates a deformation in a thickness direction of a cell upon being pressed for the touch. Because the deformation happens at local positions in the thickness direction of the cell (as shown in FIG. 2), difference between alignment of liquid crystal molecules 41 at such local positions and that of liquid crystal molecules 41 at surrounding regions causes the changes of optical path length difference, and thus the difference of the transmittivity is generated, thereby resulting in the display mura. The second reason is that when a touch force becomes large, for example, being a knocking touch, it will generate vibration sound waves. The sound waves are conducted to the liquid crystal molecules 41, so that they also cause the alignment difference, thereby causing the display mura (as shown in FIG. 3), i.e., a dynamic touch mura. A mechanism about the coupling effect of such liquid crystal molecules with the sound wave plays the most significant role for a vertical alignment (VA) type liquid crystal display, than a plane rotation type liquid crystal display such as an in plane switching (IPS) type liquid crystal display or a fringe field switching (FFS) type liquid crystal display.

At present, due to a relatively large stiffness, the protection cover glass (for example Corning Gorilla Glass) can effectively resist the first kind of touch mura caused by the deformation in the thickness direction of the liquid crystal cell, but the mura generated by too large touch force cannot be suppressed significantly. Of course, when the thickness of the transparent optical adhesive is increased, a part of the sound waves can be shield off, so as to suppress the mura generated upon the knocking touch. However, this will bring about problems such as yellow spot or bubbles.

SUMMARY

With regards to the above technical problems existing in the prior art, the present application provides a touch display panel, a method for producing the same and a display apparatus. With the provision of the sound elimination membrane, the touch display panel can eliminate the vibration sound waves generated during the knocking touch process, and avoid the alignment difference of the liquid crystal molecules due to the vibration sound waves, thereby avoiding the display mura caused by the vibration sound waves and further significantly suppressing the display mura generated during the knocking touch process.

An embodiment of the present application provides a touch display panel, including a liquid crystal screen and a protection cover plate covered at a light exiting side of the liquid crystal screen, wherein the touch display panel further includes a sound elimination membrane located at the light exiting side of the liquid crystal screen and configured to eliminate sound waves generated when the touch display panel is touched.

In one example, the sound elimination membrane includes a base body of the membrane and a plurality of holes provided in the base body of the membrane.

In one example, the plurality of holes are identical in terms of sizes and shapes and are evenly distributed.

In one example, the holes include through holes passing through a thickness of the base body of the membrane or blind holes provided in the base body of the membrane.

In one example, an opening size of the holes is in a range of 5-15 µm.

In one example, the holes have a same distributing density as that of pixels on the touch display panel.

In one example, the shape of the holes includes any of a cone frustum, a truncated pyramid, a cylinder or a prism, or any combination of these shapes.

In one example, a thickness of the sound elimination membrane is in a range of 20-40 µm.

In one example, the sound elimination membrane is made of a photo-sensitive resin material which is transparent.

In one example, the liquid crystal screen includes a color filter substrate and an array substrate assembled together, wherein the color filter substrate is located at a light exiting side of the liquid crystal screen and the protection cover plate is located at one side of the color filter substrate facing away from the array substrate.

In one example, the sound elimination membrane is located between the color filter substrate and the protection cover plate.

In one example, the sound elimination membrane is located at one side of the color filter substrate facing away from the protection cover plate.

In one example, the color filter substrate includes a substrate and a polarizer provided at one side of the substrate facing away from the array substrate, and the sound elimination membrane is located between the substrate and the polarizer.

In one example, the sound elimination membrane is located at one side of the protection cover plate facing away from the color filter substrate.

In one example, the touch display panel further includes a touch layer provided onto the array substrate, the color filter substrate or the protection cover plate.

An embodiment of the present application provides a display apparatus, including the touch display panel as described above.

An embodiment of the present application provides a method for producing the touch display panel as described above, including a step of manufacturing the sound elimination membrane at the light exiting side of the liquid crystal screen.

In one example, the step of manufacturing the sound elimination membrane at the light exiting side of the liquid crystal screen includes:

forming the sound elimination membrane onto the color filter substrate or the protection cover plate of the liquid crystal screen by a single exposure process.

In one example, the step of manufacturing the sound elimination membrane at the light exiting side of the liquid crystal screen includes:

forming the sound elimination membrane onto a glass substrate by a single exposure process, then peeling off the sound elimination membrane from the glass substrate, and finally attaching the sound elimination membrane onto the color filter substrate or the protection cover plate by a transparent optical adhesive.

Advantageous Effect of Present Application

With the provision of the sound elimination membrane, the touch display panel provided by the present application can eliminate the vibration sound waves generated during the knocking touch process, and avoid the alignment difference of the liquid crystal molecules due to the vibration sound waves, thereby avoiding the display mura caused by the vibration sound waves and further significantly suppressing the display mura generated during the knocking touch process.

With the touch display panel as described above, the display apparatus provided by the present application significantly suppresses the display mura generated during the knocking touch process and enhances the display effect thereof.

EXPLANATION ABOUT REFERENCE NUMERALS

Figure 1:
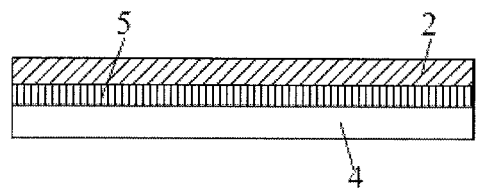
FIG. 1 is a sectional view for showing a structure of a liquid crystal module having a touch function in the prior art.
Figure 2:
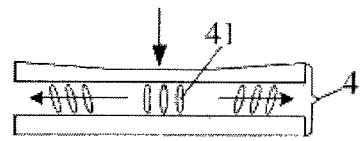
FIG. 2 is a schematic view for showing an alignment of liquid crystal molecules inside a liquid crystal panel when a deformation of the liquid crystal panel is generated in a thickness direction of a cell under a pressing effect.
Figure 3:
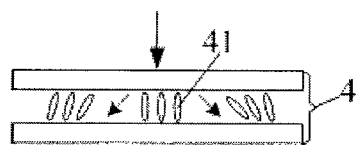
FIG. 3 is a schematic view for showing an alignment of liquid crystal molecules inside a liquid crystal panel when the liquid crystal panel is touched with a large knocking force.

1: liquid crystal screen 11: color filter substrate 110: substrate 111: polarizer 12: array substrate 2: protection cover plate 3 sound elimination membrane 31: base body of membrane 32: hole 4: liquid crystal panel 41: liquid crystal molecule 5: transparent optical adhesive

DETAILED DESCRIPTION OF THE EMBODIMENTS

In order to better understand technical solutions of the present application for those skilled in the art, a touch display panel, a method for producing the same and a display apparatus provided by the present application are described in detail with reference to the attached drawings and specific embodiments thereof.

First Embodiment

Figure 4:
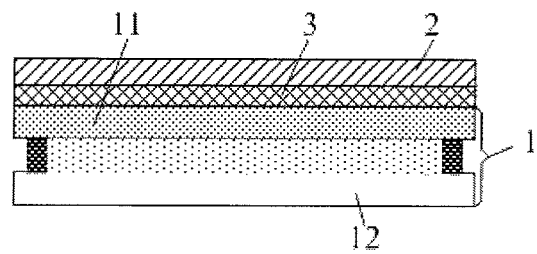
FIG. 4 is a sectional view for showing a structure of a touch display panel in according with a first embodiment of the present application.

The present embodiment provides a touch display panel, as shown in FIG. 4, which includes a liquid crystal screen 1 and a protection cover plate 2 covered at a light exiting side of the liquid crystal screen 1. The touch display panel further includes a sound elimination membrane 3, located at the light exiting side of the liquid crystal screen 1. The sound elimination membrane 3 is used to eliminate the sound waves generated when touching the touch display panel.

In the present embodiment, the liquid crystal screen 1 includes a color filter substrate 11 and an array substrate 12 assembled together, and the color filter substrate 11 is located at a light exiting side of the liquid crystal screen 1. The protection cover plate 2 is located at one side of the color filter substrate 11 facing away from the array substrate 12, and the sound elimination membrane 3 is located between the color filter substrate 11 and the protection cover plate 2.

The sound elimination membrane 3 is provided so as to eliminate vibration sound waves generated during a knocking touch, and to prevent alignment difference of liquid crystal molecules positioned between the color filter substrate 11 and the array substrate 12 due to the vibration sound waves, thereby avoiding the display mura caused by the vibration sound waves and significantly suppressing the display mura generated during the knocking touch.

It should be noted that in the present embodiment, a touch layer of the touch display panel can be provided on the array substrate 12, the color filter substrate 11 or the protection cover plate 2. In other words, there is no limitation on the specific position of the touch layer. The touch display panel can be an In cell touch panel (i.e., the touch layer is embedded into liquid crystal pixels), an On cell touch panel (i.e., the touch layer is embedded between the color filter substrate and the polarizer), or an OGS touch panel (i.e., the touch layer and the protection glass cover plate are integrated together).

Figure 5:
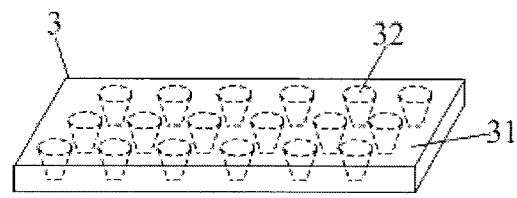
FIG. 5 is a schematic view for showing a structure of a sound elimination membrane in FIG. 4.

In the present embodiment, as shown in FIG. 5, the sound elimination membrane 3 includes a base body 31 of the membrane and a plurality of holes 32 provided on the base body 31. The holes 32 are provided so that vibration sound waves generated during a knocking touch of the touch display panel are eliminated, and alignment differences of liquid crystal molecules caused due to the vibration sound waves are prevented, thereby avoiding the display mura caused by the vibration sound waves when the touch display panel is displaying.

In the present embodiment, the plurality of holes 32 have identical sizes and shapes from each other, and are evenly distributed. Because the vibration sound waves generated upon being knocked are propagated and diffused uniformly, due to such arrangement, it can improve an elimination effect of the holes 32 to the vibration sound waves, so that the vibration sound waves can be eliminated uniformly and completely. In addition, the holes 32 arranged uniformly can also enable the sound elimination membrane 3 to transmit light uniformly, so that the sound elimination membrane 3 does not affect the property of transmitting light uniformly of the touch display panel.

In the present embodiment, the holes 32 are through holes passing through entire thickness of the base body 31 of the membrane. It should be noted that the holes 32 can also be blind holes arranged on the base body 31 of the membrane. Being the through holes or blind holes can function to eliminate the vibration sound waves.

The holes 32 have an opening size in a range of 5-15 μm. The opening sizes of the holes 32 are mainly determined depending on wavelengths of the vibration sound waves. The holes 32 having such size range can better eliminate the vibration sound waves generated by the knocking.

Figure 5A:
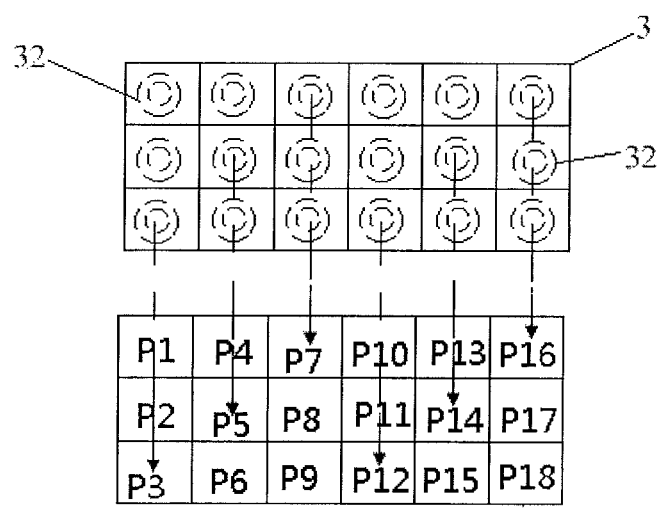
FIG. 5A is a schematic view for showing a relationship between holes of the sound elimination membrane as shown in FIG. 5 and pixels of a touch display panel.

In the present embodiment, as shown in FIG. 5A, the holes 32 have the same distribution density as that of the pixels on the touch display panel, that is the holes 32 as shown have one-to-one distribution relationship with the pixels P1, P2 . . . P18. The holes 32 having such distribution density can facilitate the elimination of the vibration sound waves generated during the knocking touch, thereby better avoiding the display mura caused by the vibration sound waves.

In the present embodiment, the holes 32 have a shape of a cone frustum. Of course, the holes 32 can also have the other suitable shapes such as a truncated pyramid, a cylinder or a prism or any combination of the above shapes.

In the present embodiment, the sound elimination membrane 3 has a thickness in a range of 20-40 μm. The sound elimination membrane 3 having such thickness can better function to eliminate the vibration sound waves generated by the knocking.

In the present embodiment, the sound elimination membrane 3 is made of a transparent photo sensitive rein material. Such kind of the sound elimination membrane 3 would not affect the normal light transmittivity of the touch display panel, while eliminating the vibration sound waves. This kind of material enables the sound elimination membrane 3 to be manufactured by coating, light exposure and development processes only, and thus the manufacturing process thereof is very simple.

The present embodiment also provides a method for producing a touch display panel, including producing a sound elimination membrane at a light exiting side of the liquid crystal screen.

Figure 9A:
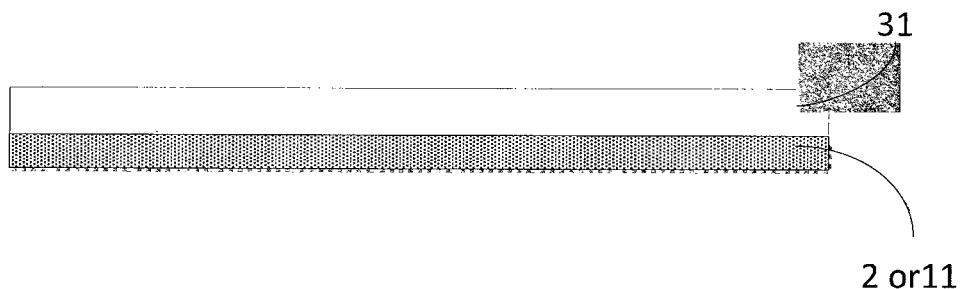
FIGS. 9A-9D show a single exposure process in accordance with an embodiment of the present application.
Figure 9B:
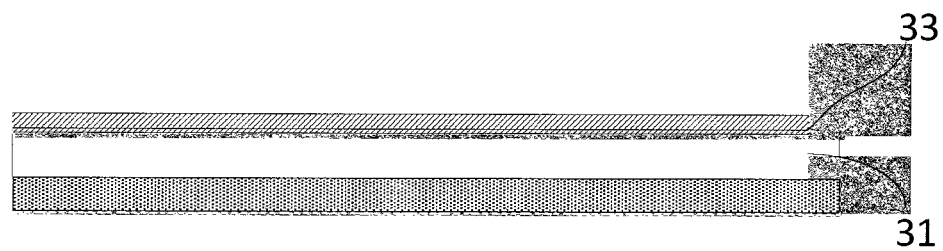
Figure 9C:
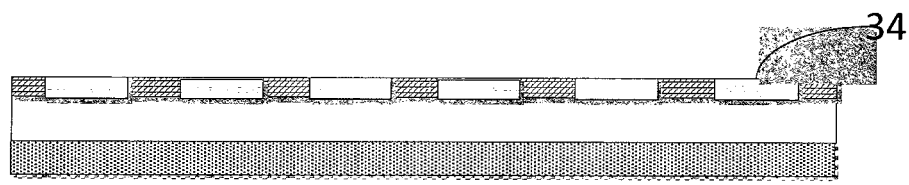
Figure 9D:
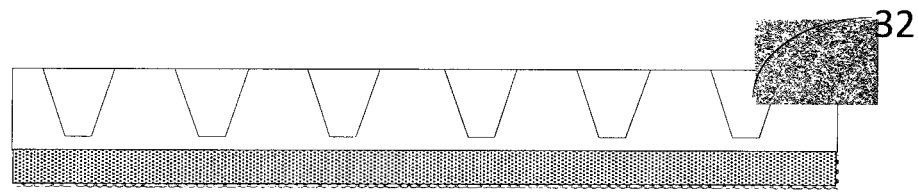

In the present embodiment, the sound elimination membrane is formed onto the color filter substrate of the liquid crystal screen by exposing it to light once time or a single exposure process. In particular, the base body 31 of the sound elimination membrane 3 is provided on the color filter substrate 11 or the protection cover plate 2 in FIG. 9A, a photo-resist layer 33 is coated thereon in FIG. 9B and the procedures of exposing to the light and development are performed to form a plurality of openings 34 in FIG. 9C. After that, the etching process is done to form the holes 32 in FIG. 9D.

Figure 10A:
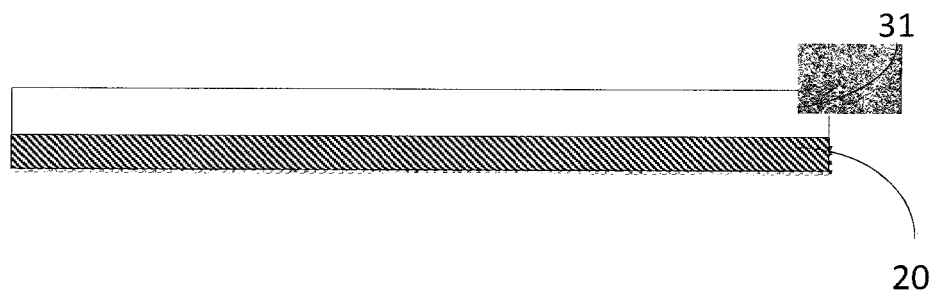
FIGS. 10A-10F show a single exposure process and a peeling off process in accordance with another embodiment of the present application.
Figure 10B:
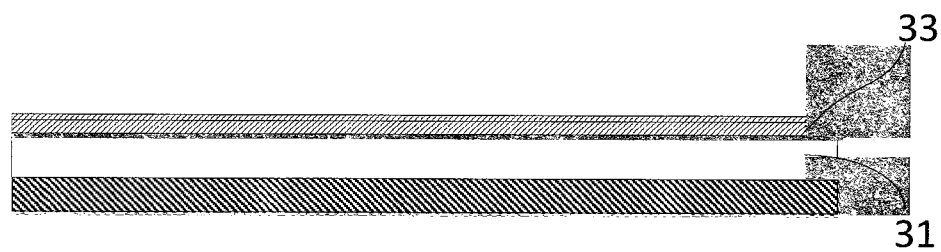
Figure 10C:
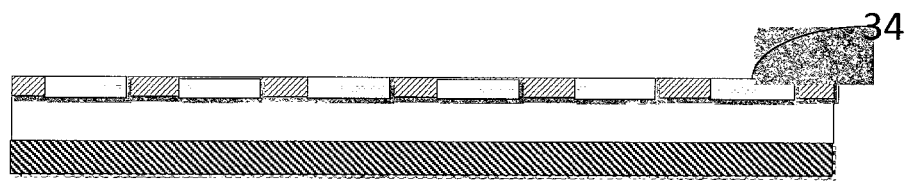
Figure 10D:
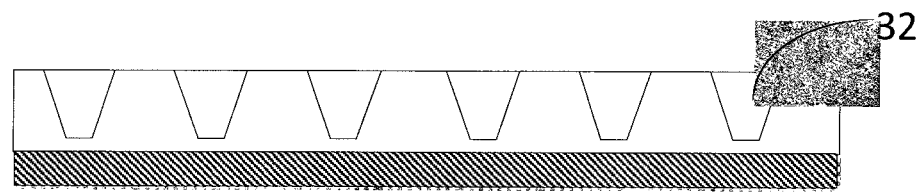
Figure 10E:
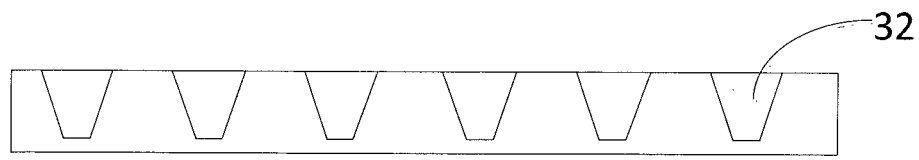
Figure 10F:
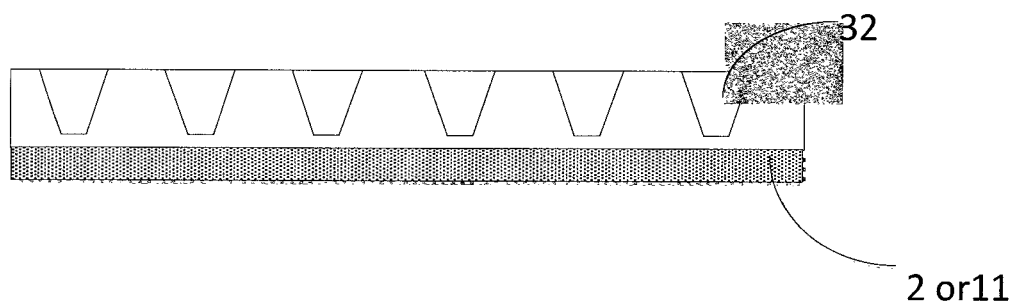

It should be noted that the sound elimination membrane in the present embodiment can also be formed on the protection cover plate by exposing it to light once time or a single exposure process. Alternatively, the sound elimination membrane is formed on the glass substrate by exposing it to light once time or a single exposure process, then the sound elimination membrane is peeled off from the glass substrate, and finally, it is attached onto the color filter substrate or the protection cover plate by a transparent optical adhesive. In particular, the base body 31 of the sound elimination membrane 3 is provided on a glass substrate 20 in FIG. 10A, a photo-resist layer 33 is coated thereon in FIG. 10B and the procedures of exposing to the light and development are performed to form a plurality of openings 34 in FIG. 10C. After that, the etching process is done to form the holes 32 in FIG. 10D. Then, the resulting sound elimination membrane 3 is peeled off in FIG. 10E and attached onto the color filter substrate 11 or the protection cover plate 2 by the transparent optical adhesive in FIG. 10F.

Second Embodiment

Figure 6:
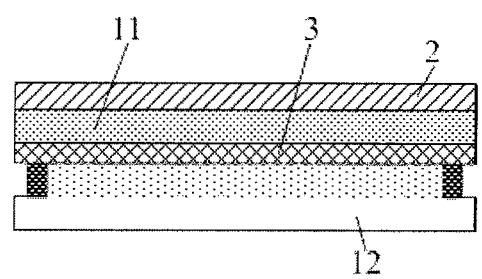
FIG. 6 is a sectional view for showing a structure of a touch display panel in accordance with a second embodiment of the present application.

This embodiment provides a touch display panel. As shown in FIG. 6, the sound elimination membrane 3 is located at one side of the color filter substrate 11 facing away from the protection cover plate 2, which is different from that of the first embodiment.

In the present embodiment, the sound elimination membrane 3 is provided on the color filer substrate 11. With such arrangement, it can ensure the vibration sound waves generated by the knocking do not pass into the liquid crystal molecules, thereby avoiding the display mura of the touch display panel caused by the vibration sound waves.

Other structure arrangements of the touch display panel in the present embodiment and the producing method thereof are identical with those as described in the first embodiment, and thus they are not repeatedly discussed herein.

Third Embodiment

Figure 7:
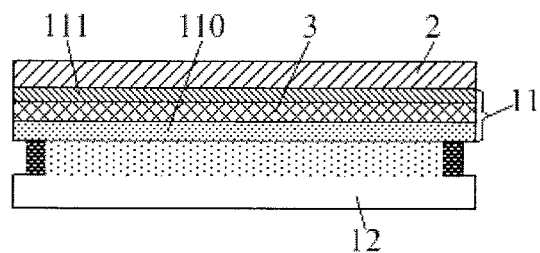
FIG. 7 is a sectional view for showing a structure of a touch display panel in accordance with a third embodiment of the present application.

This embodiment provides a touch display panel. As shown in FIG. 7, the color filter substrate 11 includes a substrate 110 and a polarizer 111 provided at the side of the substrate 110 facing away from the array substrate 12, and the sound elimination membrane 3 is located between the substrate 110 and the polarizer 111, which is different from those of the first embodiment and the second embodiment.

With such arrangement, it can ensure the vibration sound waves generated by the knocking do not pass into the liquid crystal molecules, thereby avoiding the display mura of the touch display panel caused by the vibration sound waves.

Other structure arrangements of the touch display panel in the present embodiment and the producing method thereof are identical with those as described in the first embodiment or the second embodiment, and thus they are not repeatedly discussed herein.

Fourth Embodiment

Figure 8:
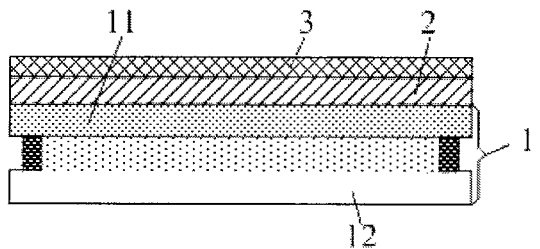
FIG. 8 is a sectional view for showing a structure of a touch display panel in accordance with a fourth embodiment of the present application.

This embodiment provides a touch display panel. As shown in FIG. 8, the sound elimination membrane 3 is located at one side of the protection cover plate 2 facing away from the color filter substrate 11.

With such arrangement, it can ensure the vibration sound waves generated by the knocking do not pass into the liquid crystal molecules, thereby avoiding the display mura of the touch display panel caused by the vibration sound waves.

Other structure arrangements of the touch display panel in the present embodiment and the producing method thereof are identical with those as described in any of the first embodiment, the second embodiment and the third embodiment, and thus they are not repeatedly discussed herein.

Advantageous Effect of the First to Fourth Embodiments

With the provision of the sound elimination membrane, the touch display panel provided by the first to fourth embodiments of the present application can eliminate the vibration sound waves generated during the knocking touch process, and avoid the alignment difference of the liquid crystal molecules due to the vibration sound waves, thereby avoiding the display mura caused by the vibration sound waves and further significantly improving the display mura generated during the knocking touch process.

Fifth Embodiment

The present embodiment provides a display apparatus, including a touch display panel as described in any of the first to fourth embodiments.

With the touch display panel as described in any of the first to fourth embodiments, the display apparatus significantly suppresses the display mura generated during the knocking touch process and enhances the display effect thereof.

It should be understood that the above embodiments are only intended to interpret the principle of the present application and used as only the illustrative examples. However, the present application is not limited to this. As for those skilled in the art, various modifications and changes may be made to the present disclosure without departing from the principles and spirit of the present application. As such, these modifications and changes to the present application are also intended to be included within the scope of the present application.

What is claimed is:

1. A touch display panel, comprising a liquid crystal screen and a protection cover plate covered at a light exiting side of the liquid crystal screen, wherein
   the touch display panel further comprises a sound elimination membrane located at the light exiting side of the liquid crystal screen and configured to eliminate sound waves generated when the touch display panel is touched,
   wherein the sound elimination membrane comprises a base body of the membrane and a plurality of holes provided in the base body of the membrane,
   wherein the holes have a same distributing density as that of pixels on the touch display panel, so that the holes have one-to-one distribution relationship with the pixels.

2. The touch display panel as claimed in claim 1, wherein the plurality of holes are identical in terms of sizes and shapes and are evenly distributed.

3. The touch display panel as claimed in claim 1, wherein the holes comprise through holes passing through a thickness of the base body of the membrane or blind holes provided in the base body of the membrane.

4. The touch display panel as claimed in claim 1, wherein an opening size of the holes is in a range of 5-15 µm.

5. The touch display panel as claimed in claim 1, wherein the shape of the holes comprises any of a cone frustum, a truncated pyramid, a cylinder or a prism, or any combination of these shapes.

6. The touch display panel as claimed in claim 1, wherein a thickness of the sound elimination membrane is in a range of 20-40 µm.

7. The touch display panel as claimed in claim 1, wherein the sound elimination membrane is made of a photo-sensitive resin material which is transparent.

8. The touch display panel as claimed in claim 1, wherein the liquid crystal screen comprises a color filter substrate and an array substrate assembled together, wherein the color filter substrate is located at the light exiting side of the liquid crystal screen and the protection cover plate is located at one side of the color filter substrate facing away from the array substrate.

9. The touch display panel as claimed in claim 8, wherein the sound elimination membrane is located between the color filter substrate and the protection cover plate.

10. The touch display panel as claimed in claim 8, wherein the sound elimination membrane is located at one side of the color filter substrate facing away from the protection cover plate.

11. The touch display panel as claimed in claim 8, wherein the color filter substrate comprises a substrate and a polarizer provided at one side of the substrate facing away from the array substrate, and the sound elimination membrane is located between the substrate and the polarizer.

12. The touch display panel as claimed in claim 8, wherein the sound elimination membrane is located at one side of the protection cover plate facing away from the color filter substrate.

13. The touch display panel as claimed in claim 8, further comprising a touch layer provided onto the array substrate, the color filter substrate or the protection cover plate.

14. A display apparatus, comprising the touch display panel as claimed in claim 1.

15. A method for producing the touch display panel as claimed in claim 1, comprising a step of manufacturing the sound elimination membrane at the light exiting side of the liquid crystal screen.

16. The method as claimed in claim 15, wherein the step of manufacturing the sound elimination membrane at the light exiting side of the liquid crystal screen comprises:
   forming the sound elimination membrane onto the color filter substrate or the protection cover plate of the liquid crystal screen by a single exposure process.

17. The method as claimed in claim 15, wherein the step of manufacturing the sound elimination membrane at the light exiting side of the liquid crystal screen comprises:
   forming the sound elimination membrane onto a glass substrate by a single exposure process, then peeling off the sound elimination membrane from the glass substrate, and finally attaching the sound elimination membrane onto the color filter substrate or the protection cover plate by a transparent optical adhesive.

* * * * *